(12) United States Patent
Flanagan et al.

(10) Patent No.: US 6,978,443 B2
(45) Date of Patent: Dec. 20, 2005

(54) METHOD AND APPARATUS FOR ORGANIZING WARNING MESSAGES

(75) Inventors: Cormac Andrias Flanagan, San Francisco, CA (US); K. Rustan M. Leino, Bellevue, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 709 days.

(21) Appl. No.: 10/042,006

(22) Filed: Jan. 7, 2002

(65) Prior Publication Data

US 2003/0131284 A1 Jul. 10, 2003

(51) Int. Cl.⁷ ................................................ G06F 9/44
(52) U.S. Cl. ..................... 717/127; 917/128; 706/47
(58) Field of Search .............................. 717/123–129, 717/140–143, 151; 706/11, 47

(56) References Cited

U.S. PATENT DOCUMENTS

| | | | | |
|---|---|---|---|---|
| 5,293,629 A | * | 3/1994 | Conley et al. | 717/154 |
| 5,675,803 A | * | 10/1997 | Preisler et al. | 717/131 |
| 5,740,440 A | * | 4/1998 | West | 717/125 |
| 5,808,889 A | * | 9/1998 | Burgess | 708/530 |
| 6,202,199 B1 | * | 3/2001 | Wygodny et al. | 717/125 |
| 6,282,701 B1 | * | 8/2001 | Wygodny et al. | 717/125 |
| 6,353,925 B1 | * | 3/2002 | Stata et al. | 717/112 |
| 6,378,087 B1 | * | 4/2002 | Flanagan et al. | 714/38 |
| 6,543,049 B1 | * | 4/2003 | Bates et al. | 717/129 |
| 6,631,518 B1 | * | 10/2003 | Bortnikov et al. | 717/158 |
| 6,651,244 B1 | * | 11/2003 | Smith et al. | 717/154 |
| 6,658,398 B1 | * | 12/2003 | Bertrand et al. | 706/47 |
| 6,745,383 B1 | * | 6/2004 | Agarwal et al. | 717/132 |
| 6,817,009 B2 | * | 11/2004 | Flanagan et al. | 717/126 |

OTHER PUBLICATIONS

Siochi et al, "Computer analysis of user interface based on repetition in transcripts of user sessions", ACM Trans. on Inf. Sys. vol. 9, No. 4, pp 309-335, Oct. 1991.*
Adrion et al, "Validation, verification and testing of computer software", ACM Computing Surveys, vol. 14, No. 2, pp 159-192, Jun. 1992.*
Sen et al, "Runtime safety analysis of multithread programs", ACM ESEC/FSE, pp 337-346, Sep., 2003.*
Robillard et al, Analyzing exception flow in Java programs, ACM SIGSOFT International Symp on Foundation of Software Engineering, 7th European Conf. pp 322-337, 1999.*

* cited by examiner

Primary Examiner—Anil Khatri

(57) ABSTRACT

The present invention is a method and apparatus for organizing warning messages generated by a computer program analyzer. A computer program analyzer generates a set of warning messages based upon potentially erroneous portions of a computer program, where each warning message identifies at least one potential error in the computer program. An inference engine infers from a subset of the set of warning messages at least one suggested-fix heuristic corresponding to each identified potential error in the subset of the set of warning messages. An association module associates each suggested-fix heuristic with the warning message containing the corresponding identified potential error. A grouping module reorders the set of warning messages so as to group together sets of warning messages having substantially similar associated suggested-fix heuristics. A result file generates a result comprising a subset of the set of warning messages ordered in grouped sets.

34 Claims, 6 Drawing Sheets

```
Suggestion: Perhaps declare "x" as "non_null"                    ⎯302
```

```
* Warning: Expression "x.f" on line 63 may cause null dereference    ⎯202
```

```
* Warning: Expression "x.f" on line 112 may cause null dereference   ⎯206
```

```
* Warning: Expression "x.g" on line 218 may cause null dereference   ⎯210
```

Warning: Expression "x.f" on line 63 may cause null dereference ~202

Suggestion: Perhaps declare "x" as "non_null" ~204

Warning: Expression "x.f" on line 112 may cause null dereference ~206

Suggestion: Perhaps declare "x" as "non_null" ~208

Warning: Expression "x.g" on line 218 may cause null dereference ~210

Suggestion: Perhaps declare "x" as "non_null" ~212

FIG. 2

Suggestion: Perhaps declare "x" as "non_null" ~302

* Warning: Expression "x.f" on line 63 may cause null dereference ~202

* Warning: Expression "x.f" on line 112 may cause null dereference ~206

* Warning: Expression "x.g" on line 218 may cause null dereference ~210

FIG. 3

Errors affecting variable "a"

Suggestion: Perhaps declare "a" as "non_null" —602

* Warning: Expression "a[i]" on line 27 may cause null dereference —604

* Warning: Expression "a[i]" on line 93 may cause null dereference —606

Suggestion: Perhaps declare the invariant "i < a.length" —608

* Warning: Expression "a[i]" on line 121 - array index possibly too large —610

Errors affecting variable "b"

Suggestion: Perhaps declare "b" as "non_null" —620

* Warning: Expression "b[n]" on line 17 may cause null dereference —622

Suggestion: Perhaps declare the invariant "n < b.length" —624

* Warning: Expression "b[n]" on line 155 - array index possibly too large —626

* Warning: Expression "b[n]" on line 173 - array index possibly too large —628

FIG. 6

METHOD AND APPARATUS FOR ORGANIZING WARNING MESSAGES

The present invention relates generally to program checking tools that automatically verify the correctness of a computer program with respect to predefined criteria, and in particular, to organizing and grouping the warning messages produced by program checking tools in order to streamline debugging of a program.

BACKGROUND OF THE INVENTION

The purpose of a program checking tool is to analyze a given computer program to determine whether or not it has certain desirable properties. Program checking tools, often called program checkers, are specific examples of verification systems that can also be used to analyze hardware components, formulae, algorithms, or, more generally, stylistic qualities or behavioral designs. A program checking tool receives a program as input, and then outputs warning messages about the execution behavior of the program. A warning may be considered to be either spurious or valid (i.e., identifying an actual program error). A spurious warning may warn about something that is not a real error, as may arise when the theorem prover does not have enough information to generate a proof. A valid warning generally warns of a real error.

Examples of program checking tools include static checkers and dynamic checkers. Static checkers catch errors at compile time without executing the program, and are valuable because they can be applied throughout the development cycle. An example of a static checker is a type checker, which compares the types (e.g., "integer," "floating point," "character," "pointer," etc.) of functions and variables of a program. A type checker detects errors such as passing inappropriate arguments for a function call, or performing an operation of one type on a variable of another type.

Another example of a static checker is the Extended Static Checker for Java ("ESC/Java") from Compaq Computer Corporation (Houston, Tex.), which checks for additional errors that are not caught by traditional type systems, such as dereferencing a null pointer, indexing an array outside its bounds, or accessing a shared variable without holding its protecting lock. In ESC/Java, a programmer writes an ordinary Java program but adds annotations, such as pre- and post-conditions on methods. Each annotated method is translated into a logical formula that is valid if and only if the method meets its specification. A theorem prover searches for counter-examples to the logical formula, which correspond to possible errors in the original Java method. A key design principle of ESC/Java is modular checking, which means that each method is checked in isolation, given only the specifications, and not the implementations, of other methods in the program.

In contrast to static checkers, dynamic checkers monitor for actual run-time errors. Dynamic checkers are a class of authoring tools that perform program checking functions and generate execution traces by executing or simulating the execution of the computer program in question. An example of a dynamic checker is Purify from Rational Software Corporation (Cupertino, Calif.), which instruments a binary program by adding protection instructions around every load and store operation. The instrumented instructions perform various checks at run-time, including checking for array access violations, uninitialized memory reads, and memory leaks. When the program is executed, a user interface displays the errors and warnings as they occur.

Using a program checking tool has several costs, one of which is the time required to inspect the checker's warnings to determine which are spurious and which are valid. A good program checking tool has the property that the warnings it produces are informative and easy for a programmer to understand. An informative warning message should, ideally, include a characterization of each possible defect (e.g., "array index out of bounds," "timing constraint not satisfied," "race condition," "deadlock," "failure to establish invariant," etc.), and a source location in the computer program where the verification system tried, but failed, to show the absence of a defect (e.g., "line 218 of file 'ABC. source'"). If a warning message is informative and easy to understand, a programmer can more easily determine whether a warning is real or spurious, as well as the nature of its cause. The programmer can then act accordingly, correcting the program at the source of the error, ignoring the warning, or annotating the program so that the warning will be suppressed next time the program checking tool is run.

However, even if a program checking tool provides informative and easy to understand warning messages, a programmer may still need to look through hundreds or thousands of warning messages, a majority of which are typically spurious. To try to reduce this burden, some program checking tools suppress all warning messages of a given kind, both spurious and valid. However, this inevitably eliminates some valid warnings. Another technique to reduce spurious warning messages is to improve the analysis of the program checking tool. However, this requires significantly more computational resources, and may still result in spurious warnings, or missed valid warnings. Yet another technique to reduce spurious warning messages is to estimate, in conjunction with the warning, the likelihood that the warning identifies an actual error, and then allow the user to filter and sort warnings based on this estimate. Again, however, this requires higher computational resources, and is only as good as the predictive heuristics of the estimator.

Therefore, it would be desirable to provide a method and apparatus of improving the warning messages generated by a program checking tool so as to allow a user to effectively and rapidly review the warning messages.

SUMMARY OF THE INVENTION

In summary, the present invention is a method for organizing warning messages generated by a computer program analyzer. The method comprises analyzing a computer program to generate a set of warning messages based upon potentially erroneous portions of the computer program, where each warning message of the set of warning messages identifies at least one potential error in the computer program. The method infers from a subset of the set of warning messages at least one suggested-fix heuristic corresponding to each identified potential error in the subset of the set of warning messages. The method also associates each suggested-fix heuristic with the warning message containing the corresponding identified potential error. Further, the method reorders the set of warning messages so as to group together sets of warning messages having substantially similar associated suggested-fix heuristics. Finally, the method also generates a result comprising a subset of the set of warning messages, ordered in grouped sets.

The present invention further includes a method for determining an actual error in a computer program. The method comprises identifying potential errors in a computer program, inferring at least one potential solution for each identified potential error, and grouping together a set of the identified potential errors having substantially similar inferred potential solutions. The method also comprises determining an actual error based on the substantially similar inferred potential solutions of the grouped set of identified potential errors.

In addition, the present invention further includes a method for organizing computer messages generated by a computer script analyzer. The method comprises analyzing a computer script to generate a set of comments about the computer script, where each comment in the set of comments corresponds to a particular portion of the computer script, and identifies a property of the corresponding portion of the computer script. The method reorders the set of comments so as to group together sets of comments having substantially similar identified properties, and generates a result comprising a subset of the set of comments, ordered in grouped sets.

The methods of the present invention are also implemented by a computer program product.

BRIEF DESCRIPTION OF THE DRAWINGS

Additional objects and features of the invention will be more readily apparent from the following detailed description and appended claims when taken in conjunction with the drawings, in which:

FIG. 2 is a block diagram of examples of warnings and suggestions generated by a program checking tool.

FIG. 3 is a block diagram exemplifying one method of organizing warning messages in accordance with an embodiment of the present invention.

FIG. 6 is a block diagram exemplifying another method of organizing warning message by super-grouping, in accordance with one embodiment of the present invention.

DESCRIPTION OF THE PREFERRED EMBODIMENTS

Figure 1:
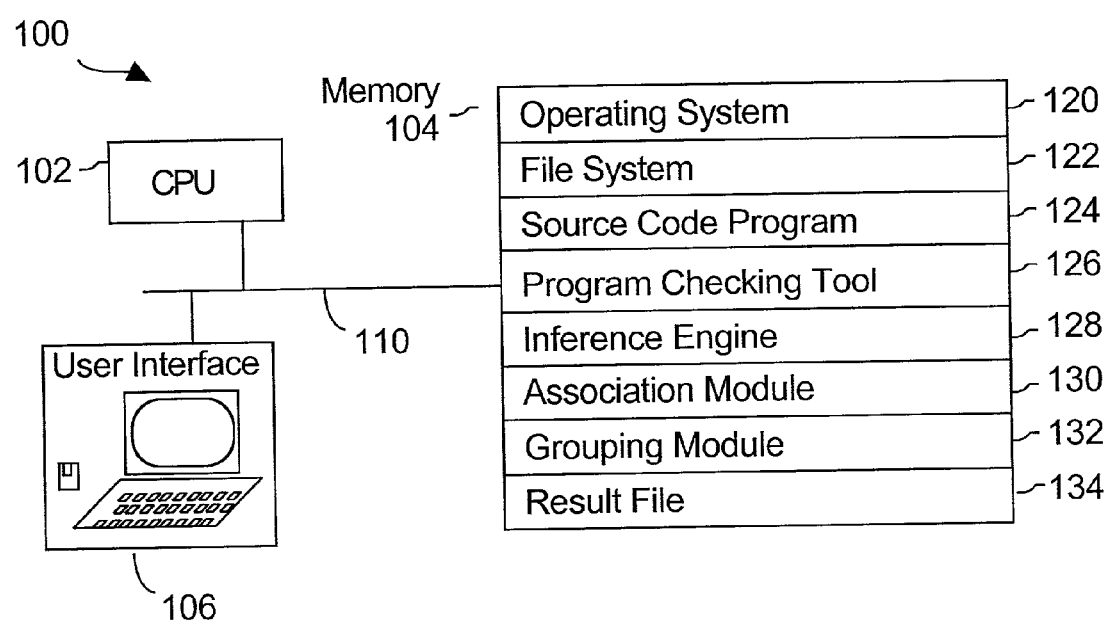
FIG. 1 is a block diagram of a general purpose computer that may practice the present invention, and in particular, shows the computer program product of one embodiment of the present invention.

The following definitions apply in this disclosure:
1. a "script" includes executable computer programs, as well as documents that are not executable, such as a word processing document or a spreadsheet;
2. a "subset" is a lesser portion of something, but may also include the entirety of the thing;
3. a "superset" is a greater portion of something, such as, for example, a combination of sets, but it may also include just the entirety of the thing;
4. the terms "suggestion," "suggested fix," and "suggested-fix heuristic" are used interchangeably herein; and
5. the terms "program checking tool," "computer program analyzer," and "computer script analyzer" are used interchangeably herein.

Generally, in a preferred embodiment, the invention organizes warning messages generated by a program checking tool based on suggested-fix heuristics. A suggested-fix heuristic is a suggestion of how to suppress a warning message and/or fix a possible error in a computer program. A suggested-fix heuristic indicates a probable cause of the warning, and may include a suggested edit to the program, such as adding or removing an annotation, or changing the program code itself. Sometimes suggested-fix heuristics are accurate in that, if implemented, they correct the underlying problem. In other cases, suggested-fix heuristics may not suggest an appropriate solution for the underlying problem, and are of little value to a programmer. The suggestions provided in the suggested-fix heuristics are only as good as the inference logic used to infer the suggestions from the warning messages.

An example of a program that generates suggestions for remedying errors is LCLint, described in: D. Evans, J. Guttag, J. Horning, and Y. M. Tan, "LCLint: A Tool For Using Specifications to Check Code," ACM SIGSOFT Symposium on the Foundations of Software Engineering, December 1994. LCLint is a type of static checker that finds common programming errors, allowing a user to specify additional checks to be conducted by adding annotations to the program being checked. It produces both warnings and suggestions for addressing the errors of the warnings. LCLint generally presents the warnings and suggestions in the sequential order that the underlying instructions of the program are analyzed.

Like LCLint, ESC/Java also generally produces warnings and suggestions in the sequential order of the underlying source code instructions. The suggestions of ESC/Java may direct a user to correct an actual bug in the program, or may direct the user to verify the validity of a condition not obvious from the context of the program by adding a "pragma." Pragmas are sequences of ESC/Java annotations similar to comments, but which provide special guidance to the ESC/Java program checker. A pragma can be used for different purposes—for example, a pragma may cause the ESC/Java checker to check for conditions not inherently discernable from the program, such as a programmer-specified precondition entering into a function call. Or, a pragma can be used to generate warning messages if certain user expectations about the behavior of the annotated program may be wrong, or can be used to suppress spurious warnings generated because of a potential error that the user verifies will not occur.

Usually, when similar or identical suggested-fix heuristics arise many times throughout a program after static or dynamic checking, the same error is generally the culprit. As a simple example, consider a program that inadvertently fails to initialize an expression "x" to a non-null value. Every time that a field of "x," for example "x.f," is evaluated (i.e., when "x" is dereferenced), a warning is generated that indicates a possible null dereference of "x.f" at a specific line. In a program having hundreds of instructions attempting to evaluate "x.f," this could generate hundreds of warning messages that are identical, except for the specified line number on which they occur. A suggestion to remedy the error, for example "perhaps declare 'x' as 'non_null,'" is likely to be the same for all such warning messages.

In ESC/Java, the suggestion to "perhaps declare 'x' as 'non_null'" refers to adding a pragma to the declaration of "x" indicating that "x" is meant to be non-null. Doing so causes ESC/Java to assume that "x" is itself non-null, and thus can safely be dereferenced. (It will also cause ESC/Java to issue a warning for any assignment to "x" if it cannot confirm that the expression being assigned will have a non-null value at run time.) If the actual non-null initialization of "x" occurs in another portion of the code (recall that ESC/Java conducts modular checking of programs), or if "x" is initialized to a non-null value dynamically determinable only at run-time, adding this pragma suppresses the spurious warning regarding a possible null dereference. On the other hand, if "x" is mistakenly not initialized to a non-null value, the suggestion to add a "non_null" pragma to the declaration of "x" would alert a programmer to this error, and direct the programmer to correct it.

If the potential null dereference warnings for "x.f" are interspersed among many different types of warnings and suggested fixes, a programmer might not be able to pick out the pattern of the recurring problem and solution. On the other hand, if all of the null dereference warnings for "x.f" were grouped together as a set under the common suggested fix of declaring "x" as "non_null," a programmer could rapidly identify the problem without having to read through every individual corresponding warning. The programmer could also rapidly identify the earliest instance of the potential error based on the first warning message in the grouped set, if the warning messages within the grouped set were organized in sequential order of occurrence. With this information, the programmer could quickly fix the potential error or suppress the spurious warning, as the case may be. The methods of the present invention leverage off of the fact that different warning messages corresponding to the same recurring error can be grouped in sets to present warning messages in a manner that facilitates efficient debugging of a program.

Referring to FIG. 1, a computer system 100 capable of practicing the present invention is shown. Computer system 100 contains one or more central processing units (CPU) 102, memory 104 (including high speed random access memory, and non-volatile memory such as disk storage), and an optional user interface 106. (The computer system 100 may also connect to a network through a network interface, not shown). The components of the computer system 100 are interconnected by one or more system busses 110. The memory 104 typically stores an operating system 120, file system 122, source code program 124, program checking tool 126, inference engine 128, association module 130, grouping module 132, and result file 134. However, many of these features of the present invention are not necessarily distinct applications. For example, inference engine 128, association module 130 and grouping module 132 may constitute a single software application implementing the functionality of the present invention. This single application could also be integrated into the program checking tool 126, or just the inference engine 128 could be integrated into the program checking tool 126. Also, while memory 104 is shown as physically contiguous, in reality, it may constitute separate memories. For example, memory 104 may include one or more disk storage devices and one or more arrays of high speed random access memory. The various files and executable modules shown in FIG. 1 may be stored in various ones of these memory devices, under the control of the operation system 120 and/or file system 122.

Referring to FIG. 2, examples of warnings and suggestions from a program checking tool are shown. Warnings 202 and 206 relate to the same warning, indicating that evaluating the expression "x.f" (e.g., reading or writing the field "f" of an object "x") may cause a null dereference, but separately indicate the program line on which each potential error has occurred. Warning 210 indicates that evaluating another field of "x"—"x.g"—may cause a null dereference. Suggested-fix heuristics 204, 208, and 212, associated with warnings 202, 206, and 210, respectively, suggest the same potential solution—declaring "x" as "non_null." As explained previously, this suggestion, derived from ESC/Java, refers to adding a pragma indicating that "x" is non-null. Doing so causes ESC/Java to assume that "x" is non-null and thus can safely be dereferenced; hence, this potentially spurious warning will be suppressed.

The suggestion to add a "non_null" pragma may also alert the programmer that the expression "x" mistakenly was not initialized to a non-null value. In this case, the suggestion itself would lead a programmer to discover the error and take steps to correct the deficiency. Given that the failure to initialize a pointer (or an array or object in Java) to point to a non-null value is a common programming error, the ability to rapidly discover and correct this error would be a valuable debugging tool. Similarly, adding a "non_null" pragma would be valuable in the static checking process, in that it would suppress spurious warnings related to dereferences of "x," which could cascade throughout the program being checked. In FIG. 2, the problem is quickly apparent because the only warnings and suggestions presented are those that are pertinent to the potential error of dereferencing "x" while evaluating "x.f" and "x.g." However, in a long, complicated program, the related warnings and suggestions could be hidden among hundreds of other warnings and suggestions.

Therefore, in one embodiment shown in FIG. 3, the grouping module of the present invention reorders the similar warning messages 202, 206, and 210, and groups them together under a representative suggested-fix heuristic 302. The original individual suggested-fix heuristics 204, 208, and 212 do not constitute part of the grouped set, although in other embodiments they may. In the present example, the representative suggested-fix heuristic 302 is identical to suggested-fix heuristics 204, 208, and 212, because these suggestions are identical to each other. In other embodiments, however, the suggested-fix heuristics are grouped together on the basis of being substantially similar. In this case, the grouping module uses grouping logic to determine which suggested-fix heuristics fall into the same class of suggestions, or are substantially similar, and then determines a representative suggested-fix heuristic which best represents the collective information of each individual suggested-fix heuristic. For example, if multiple initialization warnings occur for different fields of the same object, and the suggested-fix heuristics suggest initializing the individual fields, these warning messages could be grouped together under a representative suggested-fix heuristic suggesting initialization of the entire object.

In one embodiment, the warning messages themselves are consolidated into a representative potential error representing the identified potential errors of the warning messages of the grouped sets (not shown). If all of the warning messages in a grouped set have the same potential error, for example, a potential null dereference of a particular expression at various locations in the program, then the representative potential error is set to this same potential error, but without reference to a particular line of code. However, if the grouped warning messages identify a plurality of distinct potential errors, the representative potential error is configured to best represent the collective information of the distinct potential errors. If a representative potential error is utilized, the user is generally presented with only the representative potential error for each grouped set, and not with the entire grouped set of warning messages.

A user scanning the list of warnings and suggestions shown in FIG. 3 would quickly note that representative suggested-fix heuristic 302 suggests declaring "x" as "non_null." As discussed above, this would guide the programmer either to correct an erroneous failure to initialize "x," or to add a "non_null" pragma to suppress these warnings, if they are spurious. If the error is real, the programmer can use the first instance of the error in the source code program (i.e., line 63 in FIG. 3) to help determine the location or locations in the source code program that require correction.

Importantly, a programmer would not necessarily need to look through all of the particular warning messages 202, 206, and 210, because the individual occurrences of the potential null dereferences would not be as important as the summary of the error, as determinable from the suggested-fix heuristic. While the example in FIG. 3 only indicates three warnings associated with representative suggested-fix heuristic 302, in practice there may be tens or hundreds of grouped warning messages. By resolving this particular potential error, the user can avoid looking through a multitude of warning messages, thereby streamlining the debugging process. In one embodiment, different types of suggested-fix heuristics are displayed in different colors, allowing the user to determine potential errors even more quickly by using visual cues, in addition to the textual summaries of the potential errors.

Figure 4:
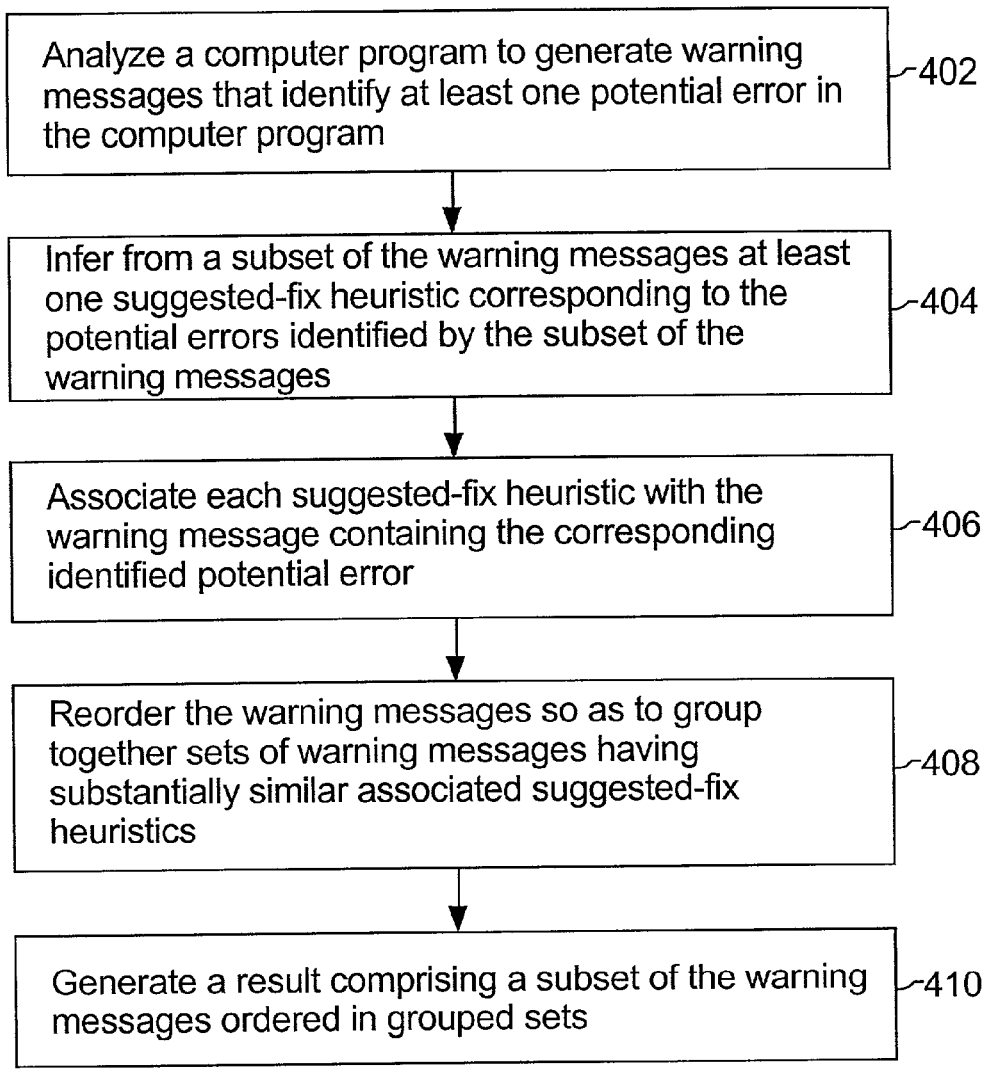
FIG. 4 is a flow chart demonstrating a method of organizing warning messages that illustrates one example of the operation of the present invention.

Turning to FIG. 4, an illustrative method of the present invention is shown. First, a program checker analyzes a computer program to generate warning messages that identify at least one potential error in the computer program (402). This is the traditional operation of a program checking tool, as described above. Then, the inference engine, or suggested-fix heuristic logic, infers from a subset of the warning messages at least one suggested-fix heuristic corresponding to the potential errors identified by the subset of the warning messages (404). The inference engine may determine its suggestion by using a look-up table to match warning messages to specific suggestions, or may heuristically determine an appropriate suggestion based on the potential error in the context of the particular program (e.g., the location of the error in a method, other variables affected by the error, etc.). The inference engine may also use any other number of logical methods of generating suggested-fix heuristics that are well-known in the art.

The association module associates each suggested-fix heuristic with the warning message containing the corresponding identified potential error (406). The association may be a direct association linking each suggested-fix heuristic and warning message together as a pair, or may be a coded affiliation whereby each warning message has an association code identifying a particular suggested-fix heuristic, perhaps maintained in a look-up table of suggested-fix heuristics.

Next, the grouping module reorders the warning messages so as to group together sets of warning messages having substantially similar associated suggested-fix heuristics (408). In one embodiment, the reordering and grouping is based upon identical suggested-fix heuristics, such as shown in FIGS. 2 and 3. In another embodiment, grouping logic is used to control the level of inclusiveness in determining what constitutes a "substantially" similar suggested-fix heuristic. For example, warning messages addressing the same potential error, but affecting different variables, could be grouped together as one grouped set, under the heading of one representative suggested-fix heuristic. The level of inclusiveness can be a set value, or it can be user-defined.

Finally, the result file and associated logic generate a result comprising a subset of the warning messages ordered in grouped sets (410). The results can be outputted to the user in a variety of forms. All of the grouped sets can be presented at one time in a result file, similar to a log file. Or, each grouped set can be presented one at a time, with the user determining when to move on to the next grouped set, perhaps after implementing or addressing the suggestion of the grouped set. Additionally, the grouped sets themselves may be ordered based on the size of the group, or the number of warning messages in the group, so that the grouped set with the largest number of warning messages is presented first (or last), as empirically determined to be the most effective for efficient debugging. Preferably, the results are presented to the user in HTML format, or other type of GUI.

Figure 5:
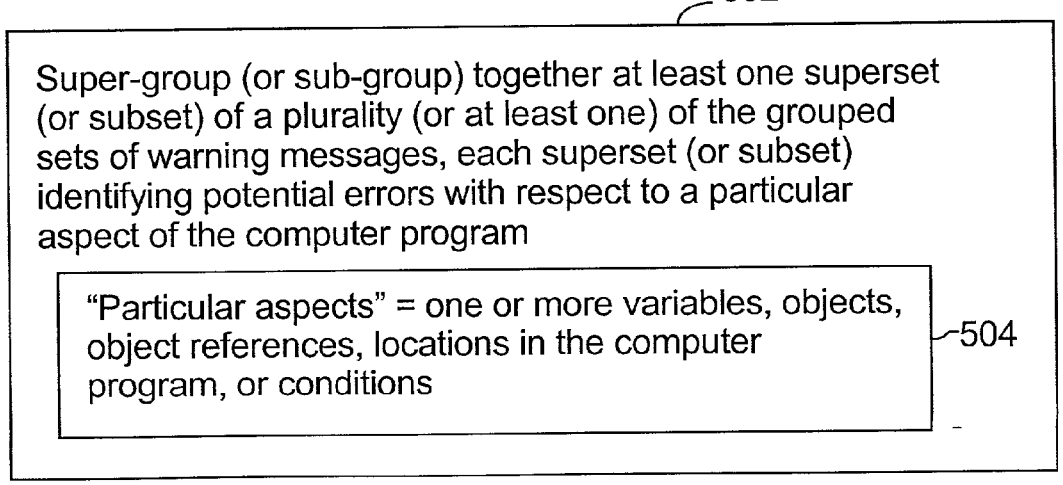
FIG. 5 demonstrates yet another method of organizing warning messages of the present invention by super-grouping and/or sub-grouping.

In another embodiment of the present invention, grouped sets of warning messages and representative suggested-fix heuristics are further super-grouped into supersets, or sub-grouped into subsets. As shown in FIG. 5, the grouping module super-groups together at least one superset of a plurality of the grouped sets of warning messages, where each superset identifies potential errors with respect to a particular aspect of the computer program (502). Or, the grouping module sub-groups together at least one subset of at least one of the grouped sets of warning messages, where each subset also identifies potential errors with respect to a particular aspect of the computer program (502).

The particular aspect in common among the warning messages could relate to one or more variables, objects, object references, locations in the computer program, or conditions, or any combination thereof (504). For example, grouped sets could be super-grouped or sub-grouped based on potential errors that all relate to the same method, the same type of error (e.g., null dereferencing), different errors for the same variable, or any number of other commonalities. This type of further grouping provides a second layer of efficiency in debugging. For example, if grouped sets of warning messages pertaining to various initialization errors, such as failures to initialize variables and to initialize pointers to non-null values, were super-grouped, a programmer could readily identify all errors of these types. Then, the programmer could make global changes to the program to correct them, such as adding a block of initialization commands early in the program. Using super-grouping and/or sub-grouping allows a user to avoid attacking similar problems in a disorganized and illogical order.

An example of super-grouping is shown in FIG. 6. In this figure, four grouped sets of warning messages are shown: (1) representative suggested-fix heuristic 602 with warning messages 604 and 606; (2) representative suggested-fix heuristic 608 with warning message 610; (3) representative suggested-fix heuristic 620 with warning message 622; and (4) representative suggested-fix heuristic 624 with warning messages 626 and 628. Groups one and two are super-grouped as a superset identifying potential errors affecting variable "a." Groups three and four are super-grouped as a superset identifying potential errors affecting variable "b".

Similar to the examples discussed previously, warning messages 604, 606, and 622 identify possible null dereferences. As before, the suggestion for this possible error identified by associated suggested-fix heuristics 602 and 620 is adding a "non_null" pragma to the declaration for the affected variables. A programmer would either choose to add this pragma if the warning is spurious, thereby suppressing it, or would recognize an actual error in initializing the affected variable, and would correct this problem.

Warning messages 610, 626, and 628 warn that control may reach an array access when "i>= a.length" (warning 610), or when "n>=b.length" (warnings 626 and 628). The suggested-fix heuristics 608 and 624 associated with these warnings suggest adding a pragma declaring the invariant "i<a.length" (suggestion 608), or declaring the invariant "n<b.length" (suggestion 624). These pragmas will cause the ESC/Java checker to assume that for each use of "a[i]," "i" is less than "a.length," and that for each use of "b[n]," "n" is less than "b.length." These pragmas will also cause the ESC/Java checker to issue a warning for any assignment to "i" or "n" that exceeds "a.length" or "b.length," respectively. Thus, the recommended pragma statements can be used to suppress spurious warnings if the programmer verifies that these conditions to be specified in the pragmas are true. Or, as with the suggestion to use a "non_null" pragma, the suggestion to add a pragma declaring the invariant smaller than the length of the array might also highlight an actual array-out-of-bounds error in the program, leading the programmer to rapidly identify and correct the error.

Clearly, then, the suggested-fix heuristics 602, 608, 620, and 624 are helpful in resolving the potential errors identified by the warning messages, whether the user corrects actual errors, or provides pragma annotations verifying program design and suppressing spurious warnings. Therefore, through the grouping of supersets together as shown in FIG. 6, a user can succinctly and precisely identify certain classes of problems. In this example, a programmer could readily identify which potential errors affect variable "a," and which affect variable "b." This could be useful if the user believes an error exists with respect to a particular variable, and wants to review all suggested-fix heuristics pertaining to that variable. Of course, the method of supergrouping warning messages by affected variable shown in FIG. 6 is merely illustrative, and any number of other organization patterns or methodologies could be employed, with the end goal being the simplification and streamlining of the debugging process.

Figure 7:
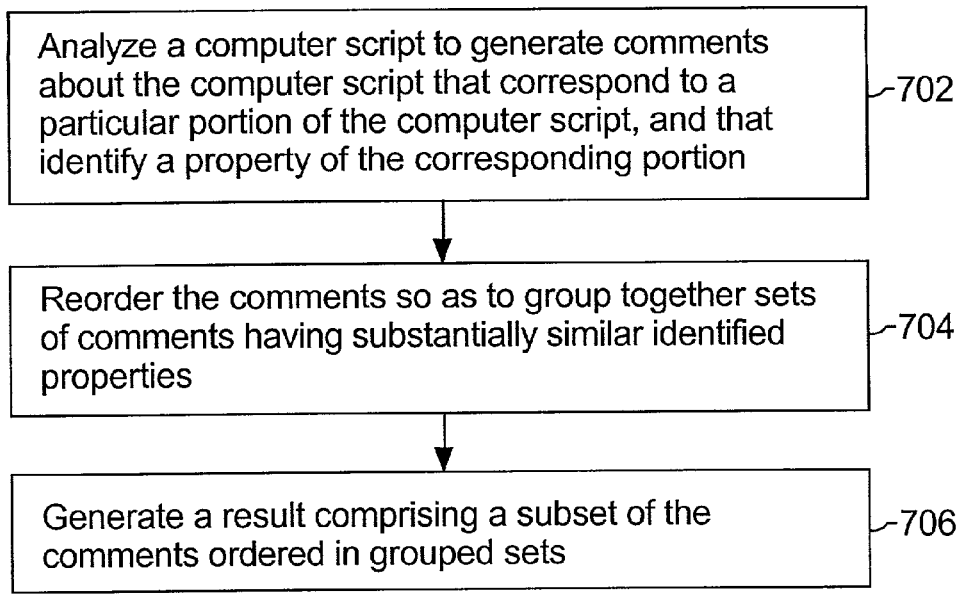
FIG. 7 is a flow chart demonstrating a method of organizing comments generated by a computer script analyzer, illustrating another method of operation of the present invention.

Another example of a method of the present invention is shown in FIG. 7. In this method, a computer script analyzer analyzes a computer script to generate comments about the computer script that correspond to a particular portion of the computer script, and that identify a property of the corresponding portion (702). As defined above, a script includes not only executable computer programs, but also nonexecutable documents like word processing documents and spreadsheets. Hence, the invention is applicable to computer script analyzers that analyze a document for properties such as style, spelling, grammar, numerical errors, etc. It is also applicable to computer script analyzers that analyze a program for properties such as complexity and behavior. The grouping module reorders the comments so as to group together sets of comments having substantially similar identified properties (704). Finally, the result file and associated logic generate a result comprising a subset of the comments ordered in grouped sets (706). As with program checking tools, when using a computer script analyzer, it is beneficial to group together comments regarding properties of a document, like all instances of a particular style or spelling error. This way, a user can view all comments having identical, or substantially similar, properties at one time, and thus rapidly identify and fix errors on a global basis.

In one embodiment of the present invention, the inference engine may infer more than one suggested-fix heuristic for each potential error. This is especially likely to occur when the potential error can have different types of deleterious effects on a program. However, for purposes of organizing and grouping warning messages, it is much easier to use single suggested-fix heuristic/warning message pairs. Thus, in this embodiment, the association module duplicates the warning message having a potential error with more than one associated suggested-fix heuristic. It then associates each individual suggested-fix heuristic with an individual copy of the warning message.

Figure 8:
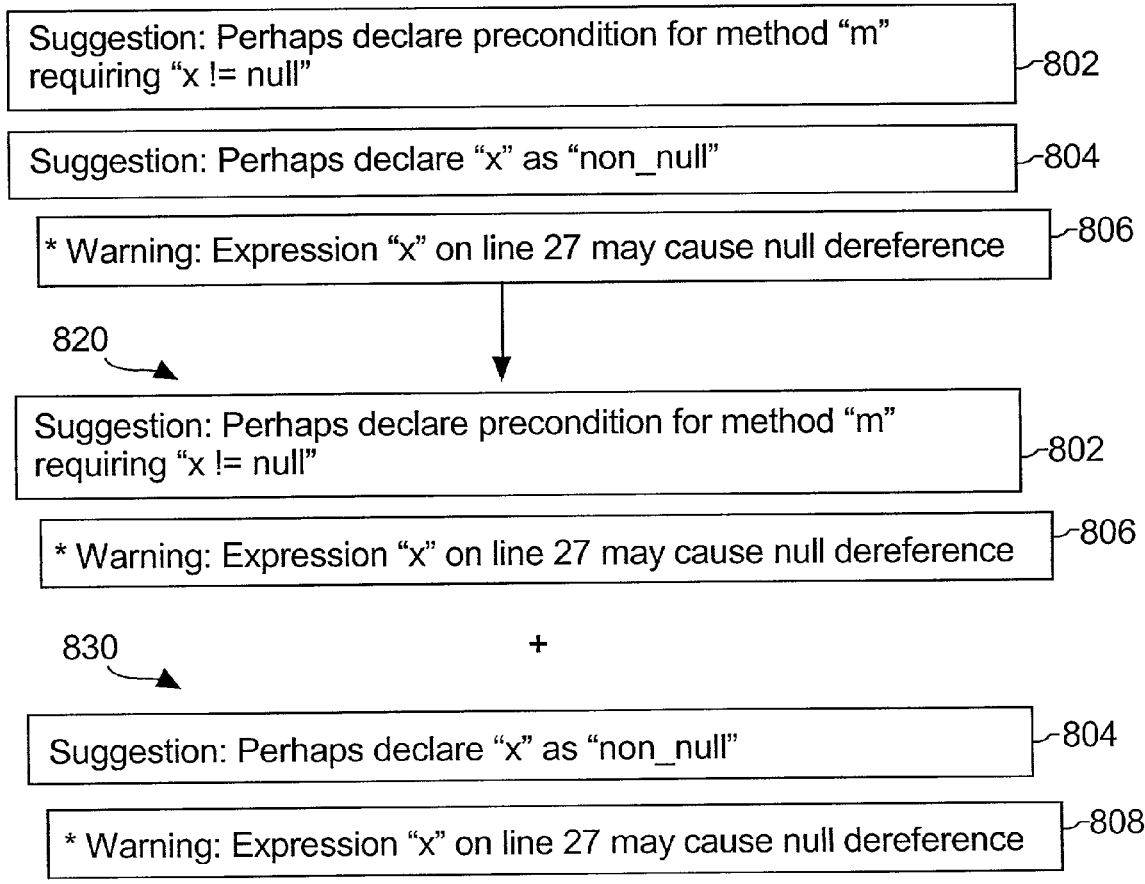
FIG. 8 is a flow chart showing a method of dividing suggestions and replicating warning messages when multiple suggestions are made for a single warning, in accordance with an embodiment of the present invention.

FIG. 8 shows the functionality of dividing a warning message with multiple associated suggested-fix heuristics into separate suggested-fix heuristic/warning message pairs. In particular, warning message 806 indicates that the expression "x" may cause a null dereference. In this example, the inference engine determines two possible suggestions: declaring "x" as "non_null" (804), and declaring a precondition for the method "m" (in which the dereferencing of "x" occurs), requiring that "x" be not equal to null (806). If the user confirms that the warning is spurious, annotating the code to add a pragma implementing either suggestion will suppress warning 806. Alternatively, if an actual null dereferencing error exists in the code, the presence of suggestions 802 and 804 should alert a programmer to the error.

Because, in one embodiment, the grouping module reorders and groups based on suggested-fix heuristic/warning message pairs, the double suggestion of warning 806 must be divided into two separate pairs. To create the suggested-fix heuristic/warning message pairs 820 and 830, warning message 806 is replicated to create identical warning message 808. Then, the association module transfers association of suggested-fix heuristic 804 from original warning message 806 to replicated warning message 808, thereby creating the suggested-fix heuristic/warning message pairs 820 and 830.

Figure 9:
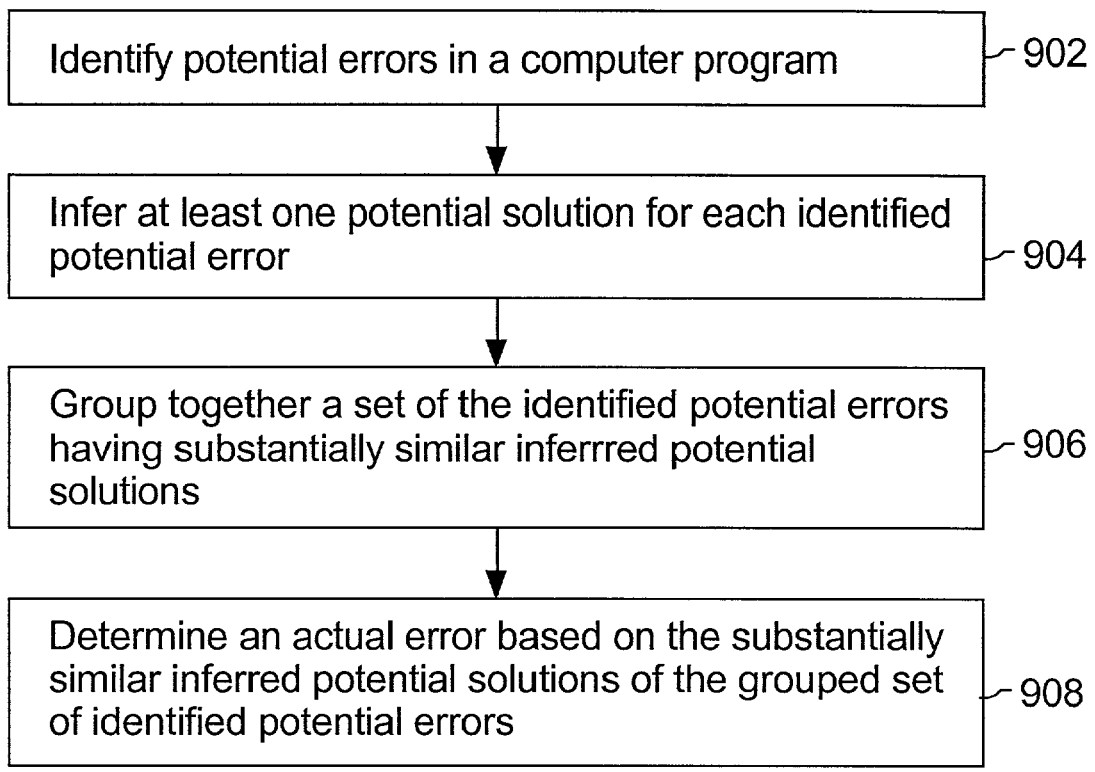
FIG. 9 is a flow chart demonstrating a method of determining an actual error in a computer program, in accordance with one embodiment of the present invention.

Referring to FIG. 9, a method of the present invention for detecting an actual error in a computer program is shown. A computer program analyzer identifies potential errors in a computer program (902). Then, an inference engine infers at least one potential solution for each identified potential error (904). A grouping module groups together a set of the identified potential errors having substantially similar inferred potential solutions (906). Finally, a result file and associated logic determines an actual error based on the substantially similar inferred potential solutions of the grouped set of identified potential errors (908). The actual error may be determined when a programmer reviews the grouped set of substantially similar inferred potential solutions, and then reviews the corresponding code to discover the discrepancy. Alternatively, the result file and associated logic can automatically determine the actual error if a programmer has added sufficient annotations to the source code program to suppress spurious warnings, leaving only actual errors to be reported.

One potential application into which the warning message organizing features of the present invention could be integrated is an annotation assistant. An example of an annotation assistant for ESC/Java is "Houdini," described in: C. Flanagan and K. R. M. Leino, "Houdini, an Annotation Assistant for ESC/Java," SRC Technical Note 2000-003 (Dec. 31, 2000), available at http://www.research.compaq.com/SRC/. Houdini makes ESC/Java more useful by catching defects in unannotated legacy code by inferring suitable ESC/Java annotations. Essentially, Houdini conjectures a large number of possible candidate annotations, and then uses ESC/Java to verify or refute each of these annotations. Thus, the integration of the present invention into Houdini would be extremely valuable because the non-organized warning messages and suggestions of ESC/Java are used at least twice in Houdini. First, ESC/Java is used to verify or refute the ESC/Java annotations inferred by Houdini, which themselves might be inferred directly from suggested-fix heuristics, and second, ESC/Java is used when the original source code program is statically checked by ESC/Java.

The present invention can also be implemented as a computer program product that includes a computer program mechanism embedded in a computer readable storage medium. For instance, the computer program product could contain the inference engine, association module, grouping module, and result file shown in FIG. 1. These program modules may be stored on a CD-ROM, magnetic disk storage product, or any other computer readable data or program storage product. The software modules in the computer program product may also be distributed electronically, via the Internet or otherwise, by transmission of a computer data signal (in which the software modules are embedded) on a carrier wave.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method for organizing computer messages generated by a computer script analyzer, the method comprising:
analyzing a computer script to generate a plurality of comments about the computer script, each comment of the plurality of comments corresponding to a particular portion of the computer script, each comment identifying a property of the corresponding portion of the computer script;
reordering the plurality of comments so as to group together sets of comments having substantially similar identified properties; and
generating a result comprising a subset of the plurality of comments ordered in grouped sets.

2. A method for organizing warning messages generated by a computer program analyzer, the method comprising:
analyzing a computer program to generate a plurality of warning messages based upon potentially erroneous portions of the computer program, each warning message of the plurality of warning messages identifying at least one potential error in the computer program;
inferring from a subset of the plurality of warning messages at least one suggested-fix heuristic corresponding to each identified potential error in the subset of the plurality of warning messages;
associating each suggested-fix heuristic with the warning message containing the corresponding identified potential error;
reordering the plurality of warning messages so as to group together sets of warning messages having substantially similar associated suggested-fix heuristics; and
generating a result comprising a subset of the plurality of warning messages ordered in grouped sets.

3. The method of claim 2, further comprising sub-grouping together at least one subset of at least one of the grouped sets of warning messages, wherein each subset of warning messages identifies potential errors with respect to a particular aspect of the computer program.

4. The method of claim 3, where the particular aspect of the computer program comprises at least one of a variable, an object, an object reference, a location in the computer program, and a condition.

5. The method of claim 2, further comprising super-grouping together at least one superset of a plurality of the grouped sets of warning messages, wherein each superset of warning messages identifies potential errors with respect to a particular aspect of the computer program.

6. The method of claim 5, where the particular aspect of the computer program comprises at least one of a variable, an object, an object reference, a location in the computer program, and a condition.

7. The method of claim 2, wherein the generated result further comprises, for each grouped set, a representative suggested-fix heuristic representing the substantially similar associated suggested-fix heuristics.

8. The method of claim 7, wherein the generated result does not include the substantially similar associated suggested-fix heuristics.

9. The method of claim 2, wherein the generated result identifies, for each grouped set, a representative potential error representing the identified potential errors of the warning messages in the grouped set.

10. The method of claim 2, wherein the generated result identifies, for each grouped set, a representative potential error representing a plurality of distinct potential errors identified by the warning messages in the grouped set.

11. The method of claim 2, further comprising, when more than one suggested-fix heuristic is inferred for a corresponding identified potential error, duplicating the warning message containing the corresponding identified potential error so that the associating generates separate suggested-fix heuristic/warning message pairs for each suggested-fix heuristic of the more than one inferred suggested-fix heuristic.

12. The method of claim 2, wherein the reordering and generating comprise:
reordering the plurality of warning messages so as to cluster warning messages together based on classes of associated suggested-fix heuristics; and
generating a result comprising a subset of the clustered warning messages.

13. The method of claim 2, wherein the substantially similar associated suggested-fix heuristics of each grouped set of warning messages are identical to each other.

14. The method of claim 2, wherein the generating further comprises displaying one grouped set of warning messages at a time.

15. The method of claim 2, wherein the generating further comprises:
ordering the grouped sets of warning messages based on group size; and
generating a result comprising a subset of the ordered group sets of warning messages.

16. A method of determining an actual error in a computer program, the method comprising:
identifying potential errors in the computer program;
inferring, for each identified potential error, at least one potential solution;
grouping together a set of the identified potential errors having substantially similar inferred potential solutions; and determining an actual error based on the substantially similar inferred potential solutions of the grouped set of identified potential errors.

17. The method of claim 16, wherein the substantially similar inferred potential solutions and the grouped set of identified potential errors have characteristics suggestive of the actual error.

18. A computer program product for use in conjunction with a computer system, the computer program product comprising a computer readable storage medium and a computer program mechanism embedded therein, the computer program mechanism comprising:
 a computer script;
 a computer script analyzer for analyzing the computer script to generate a plurality of comments about the computer script, each comment of the plurality of comments corresponding to a particular portion of the computer script, each comment identifying a property of the corresponding portion of the computer script;
 a grouping module for reordering the plurality of comments so as to group together sets of comments having substantially similar identified properties; and
 a result file for generating a result comprising a subset of the plurality of comments in grouped sets.

19. A computer program product for use in conjunction with a computer system, the computer program product comprising a computer readable storage medium and a computer program mechanism embedded therein, the computer program mechanism comprising:
 a computer program; a computer program analyzer for analyzing the computer program to generate a plurality of warning messages based upon potentially erroneous portions of the computer program, each warning message of the plurality of warning messages identifying at least one potential error in the computer program;
 an inference engine for inferring from a subset of the plurality of warning messages at least one suggested-fix heuristic corresponding to each identified potential error in the subset of the plurality of warning messages;
 an association module for associating each suggested-fix heuristic with the warning message containing the corresponding identified potential error;
 a grouping module for reordering the plurality of warning messages so as to group together sets of warning messages having substantially similar associated suggested-fix heuristics; and
 a result file for generating a result comprising a subset of the plurality of warning messages ordered in grouped sets.

20. The computer program product of claim 19, wherein the grouping module further subgroups together at least one subset of at least one of the grouped sets of warning messages, wherein each subset of warning messages identifies potential errors with respect to a particular aspect of the computer program.

21. The computer program product of claim 20, where the particular aspect of the computer program comprises at least one of a variable, an object, an object reference, a location in the computer program, and a condition.

22. The computer program product of claim 19, wherein the grouping module further super-groups together at least one superset of a plurality of the grouped sets of warning messages, wherein each superset of warning messages identifies potential errors with respect to a particular aspect of the computer program.

23. The computer program product of claim 22, where the particular aspect of the computer program comprises at least one of a variable, an object, an object reference, a location in the computer program, and a condition.

24. The computer program product of claim 19, wherein the generated result further comprises, for each grouped set, a representative suggested-fix heuristic representing the substantially similar associated suggested-fix heuristics.

25. The computer program product of claim 24, wherein the generated result does not include the substantially similar associated suggested-fix heuristics.

26. The computer program product of claim 19, wherein the generated result identifies, for each grouped set, a representative potential error representing the identified potential errors of the warning messages in the grouped set.

27. The computer program product of claim 19, wherein the generated result identifies, for each grouped set, a representative potential error representing a plurality of distinct potential errors identified by the warning messages in the grouped set.

28. The computer program product of claim 19, further comprising, when more than one suggested-fix heuristic is inferred for a corresponding identified potential error, instructions for duplicating the warning message containing the corresponding identified potential error so that the association module generates separate suggested-fix heuristic/warning message pairs for each suggested-fix heuristic of the more than one inferred suggested-fix heuristic.

29. The computer program product of claim 19, wherein the grouping module reorders the plurality of warning messages so as to cluster warning messages together based on classes of associated suggested-fix heuristics, and further wherein the result file generates a result comprising a subset of the clustered warning messages.

30. The computer program product of claim 19, wherein the substantially similar associated suggested-fix heuristics of each grouped set of warning messages are identical to each other.

31. The computer program product of claim 19, wherein the result file further displays one grouped set of warning messages at a time.

32. The computer program product of claim 19, wherein the grouping module further orders the grouped sets of warning messages based on group size, and further wherein the result file generates a result comprising a subset of the ordered group sets of warning messages.

33. A computer program product for use in conjunction with a computer system, the computer program product comprising a computer readable storage medium and a computer program mechanism embedded therein, the computer program mechanism comprising:
 a computer program;
 a computer program analyzer for identifying potential errors in the computer program;
 an inference engine for inferring, for each identified potential error, at least one potential solution;
 a grouping module for grouping together a set of the identified potential errors having substantially similar inferred potential solutions; and
 a result file for determining an actual error based on the substantially similar inferred potential solutions of the grouped set of identified potential errors.

34. The computer program product of claim 33, wherein the substantially similar inferred potential solutions and the grouped set of identified potential errors have characteristics suggestive of the actual error.

* * * * *